(12) United States Patent
Nakamura et al.

(10) Patent No.: US 9,960,701 B2
(45) Date of Patent: May 1, 2018

(54) BOOST CONVERTER

(71) Applicant: TOYOTA JIDOSHA KABUSHIKI KAISHA, Toyota-shi, Aichi-ken (JP)

(72) Inventors: Ikuhiro Nakamura, Nisshin (JP); Kozo Matsuura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/638,545

(22) Filed: Jun. 30, 2017

(65) Prior Publication Data

US 2018/0026533 A1 Jan. 25, 2018

(30) Foreign Application Priority Data

Jul. 21, 2016 (JP) ................................. 2016-142884

(51) Int. Cl.
*H02M 7/00* (2006.01)
*B60L 11/18* (2006.01)
*H02M 3/158* (2006.01)

(52) U.S. Cl.
CPC ......... *H02M 7/003* (2013.01); *B60L 11/1896* (2013.01); *H02M 3/1588* (2013.01)

(58) Field of Classification Search
CPC .. H02M 7/003; H02M 3/1588; B60L 11/1896
See application file for complete search history.

(56) References Cited

U.S. PATENT DOCUMENTS

| | | | | |
|---|---|---|---|---|
| 8,673,467 B2 * | 3/2014 | Katano | ................... | B60K 1/04 180/65.31 |
| 9,356,538 B2 * | 5/2016 | Kon | ......................... | H02P 3/14 |
| 2012/0021301 A1 * | 1/2012 | Ohashi | ..................... | B60K 1/04 429/400 |
| 2013/0056291 A1 * | 3/2013 | Hotta | ....................... | B60K 1/04 180/65.31 |
| 2013/0306387 A1 | 11/2013 | Katano et al. | | |
| 2018/0013373 A1 * | 1/2018 | Sawamura | ............ | H02P 29/024 |

FOREIGN PATENT DOCUMENTS

WO    2013084278 A1    6/2013

* cited by examiner

*Primary Examiner* — Kyle J Moody
(74) *Attorney, Agent, or Firm* — Dickinson Wright, PLLC (57) ABSTRACT

There is provided a boost converter. The boost converter comprises a reactor electrically connected with a power source; a semiconductor module configured to include a plate-like member and a terminal protruded from the plate-like member; a holder portion provided as a frame-like member, arranged to be adjacent to the reactor along either a longitudinal direction of a vehicle or a vehicle width direction, and configured to hold a plurality of the semiconductor modules inside of a frame of the holder portion such that the plurality of semiconductor modules are stacked and pressurized; and a first bus bar arranged to electrically connect the reactor with the terminal and provided with a current sensor that is configured to detect an electric current flowing from the reactor to the semiconductor modules. At least part of the current sensor is provided in the first bus bar such as to be placed inside of a range that is defined by respective ends of the holder portion in an array direction in which the reactor and the holder portion are arranged to be adjacent to each other. This configuration prevents increase of the dimension of the boost converter either in the longitudinal direction of the vehicle or in the vehicle width direction.

4 Claims, 5 Drawing Sheets

BOOST CONVERTER

CROSS-REFERENCE TO RELATED APPLICATIONS

The present application claims priority from Japanese patent application 2016-142884 filed on Jul. 21, 2016, the entirety of the content of which is hereby incorporated by reference into this application.

BACKGROUND

Field

The present disclosure relates to a boost converter.

Related Art

A proposed configuration of a boost converter to boost a voltage output from a power source may include a reactor electrically connected with the power source, a semiconductor module electrically connected with the reactor, and a bus bar arranged to electrically connect the reactor with the semiconductor module and provided with a current sensor that is configured to detect an electric current flowing from the reactor to the semiconductor module. The boost converter may be mounted, for example, in a center tunnel that is extended in a longitudinal direction of a vehicle under a floor of a vehicle interior (as described in JP 5483221).

A fuel cell vehicle described in JP 5483221 includes the boost converter mounted in the center tunnel. A layout that such a boost converter is placed in a front room of the vehicle is likely to have the stricter limitation in a height direction of the vehicle, compared with a configuration that the boost converter is placed in the center tunnel. Because of this limitation, a possible layout design may array the reactor, the semiconductor module and the current sensor in a horizontal direction, such as to reduce the total height of the boost converter. In this layout design, however, arraying the reactor, the semiconductor module and the current sensor in the horizontal direction is likely to increase the dimension of the boost converter in the horizontal direction. This may result in a difficulty in mounting the boost converter in the front room of the vehicle. In order to solve this problem, there is a demand for a technique that prevents increase of the dimension in the horizontal direction in the layout that the reactor, the semiconductor module and the current sensor are arrayed in the horizontal direction.

SUMMARY

In order to solve at least part the problems described above, the disclosure may be implemented by aspects described below.

According to one aspect of the disclosure, there is provided a boost converter mounted in a front room of a vehicle that is a space provided on a front side of a vehicle interior and configured to boost a voltage output from a power source mounted on the vehicle. The boost converter comprises a reactor electrically connected with the power source; a semiconductor module configured to include a plate-like member and a terminal protruded from the plate-like member; a holder portion provided as a frame-like member, arranged to be adjacent to the reactor along either a longitudinal direction of the vehicle or a vehicle width direction, and configured to hold a plurality of the semiconductor modules inside of a frame of the holder portion such that the plurality of semiconductor modules are stacked and pressurized; and a first bus bar arranged to electrically connect the reactor with the terminal and provided with a current sensor that is configured to detect an electric current flowing from the reactor to the semiconductor modules. At least part of the current sensor is provided in the first bus bar such as to be placed inside of a range that is defined by respective ends of the holder portion in an array direction in which the reactor and the holder portion are arranged to be adjacent to each other. This configuration of the boost converter prevents increase of the dimension of the boost converter in the array direction in which the reactor and the holder portion are arranged to be adjacent to each other, compared with a configuration that the current sensor is entirely placed outside of the range that is defined by the respective ends of the holder portion in the array direction in which the reactor and the holder portion are arranged to be adjacent to each other.

DESCRIPTION OF EMBODIMENTS

A. First Embodiment

Figure 1:
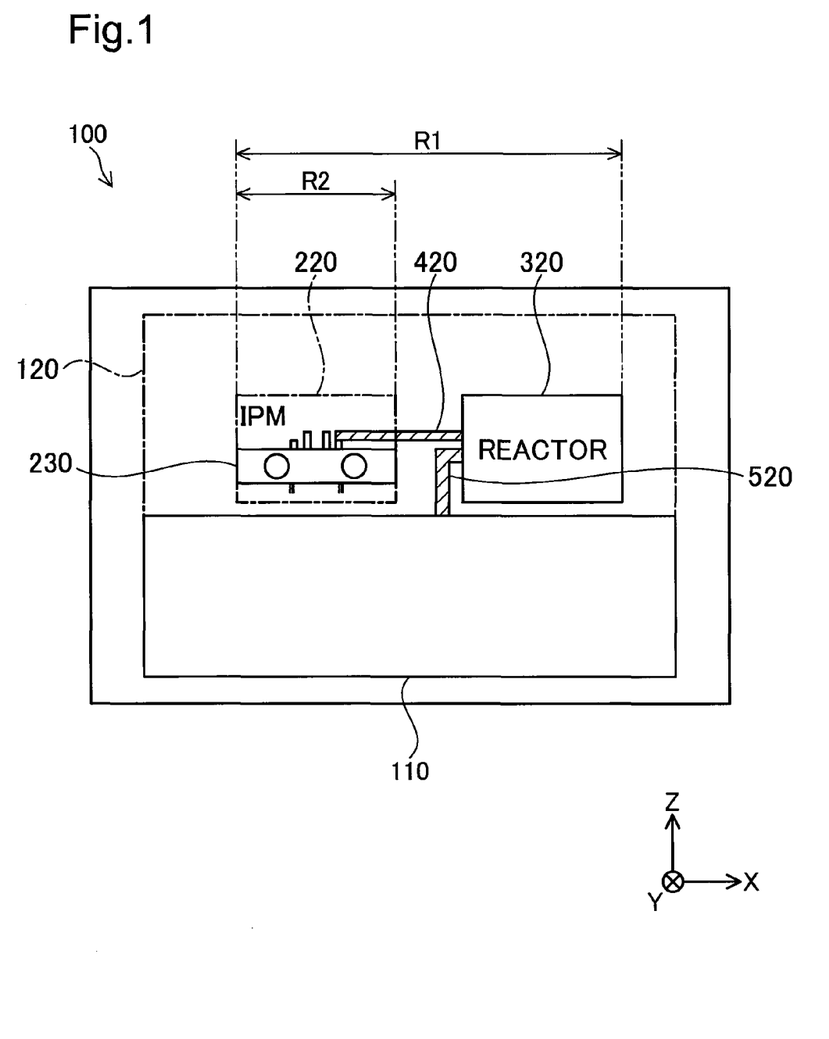
FIG. 1 is a diagram illustrating the schematic configuration of a fuel cell unit including a boost converter according to one embodiment of the disclosure.

FIG. 1 is a diagram illustrating the schematic configuration of a fuel cell unit 100 including a boost converter 120 according to one embodiment of the disclosure. XYZ axes that are orthogonal to one another are illustrated in FIG. 1. The Z axis among the XYZ axes shown in FIG. 1 is a coordinate axis going upward in the direction of gravity. The XYZ axes shown in FIG. 1 correspond to XYZ axes shows in other drawings. With regard to each of the XYZ axes, a direction shown by an arrow is positive direction, and an opposite direction to the direction shown by the arrow is negative direction. The fuel cell unit 100 is mounted in a front room of a vehicle that is a space provided on a front side of a vehicle interior, as a power supply of the vehicle that is driven with a motor. A longitudinal direction of the vehicle with the fuel cell unit 100 mounted therein is along the Y axis, and a vehicle width direction is along the X axis. The fuel cell unit 100 is configured to include a fuel cell stack 110 and a boost converter 120.

The fuel cell stack 110 has a stack structure by stacking a plurality of unit cells. Each unit cells is configured such that a membrane electrode assembly provided by forming an anode and a cathode on respective surfaces of an electrolyte membrane having proton conductivity is placed between separators. The fuel cell stack 110 is configured to receive supplies of hydrogen gas and the air and generate electric power by an electrochemical reaction of hydrogen and oxygen.

The boost converter 120 is placed on a +Z-axis direction side of the fuel cell stack 110. The boost converter 120 is a soft switching-type boost converter (DC/DC converter) configured to boost the voltage of DC power output from the fuel cell stack 110. The boost converter 120 is configured to include an IPM 220, a reactor 320, a first bus bar 420 and a second bus bar 520.

The reactor 320 is configured by a ring-shaped core portion and a coil wound on an outer circumference of the core portion. The reactor 320 is electrically connected with the fuel cell stack 110 via the second bus bar 520.

The IPM (intelligent power module) 220 is placed on a −X-axis direction side of the reactor 320. The IPM 220 is a circuit module in which a plurality of semiconductor elements are incorporated in advance. The IPM 220 and the reactor 320 are arrayed along the X-axis direction.

The first bus bar 420 is a member formed from a material having electrical conductivity. The first bus bar 420 is placed between the reactor 320 and the IPM 220 to electrically connect the reactor 320 with the IPM 220.

The second bus bar 520 is a member formed from a material having electrical conductivity. The second bus bar 520 is provided to electrically connect the reactor 320 with the fuel cell stack 110. The second bus bar 520 is a member including a portion extended in the X-axis direction and a portion extended in the Z-axis direction, such as to connect a −X-axis direction part of the reactor 320 with a +Z-axis direction part of the fuel cell stack 110.

The second bus bar 520 is placed on a −Z-axis direction side of the first bus bar 420. This configuration prevents increase of the dimension of the boost converter 120 in the X-axis direction, compared with a configuration that the first bus bar 420 and the second bus bar 520 are arrayed in the X-axis direction. A general layout design of bus bars arrays a first bus bar and a second bus bar in a horizontal direction to reduce their inductance components. In a boost converter, however, a reactor has a large inductance component, so that the inductance components of the bus bars are negligible. This allows the first bus bar and the second bus bar to be arranged one above the other in the direction of gravity.

A range R1 and a range R2 shown in FIG. 1 will be described later.

Figure 2:
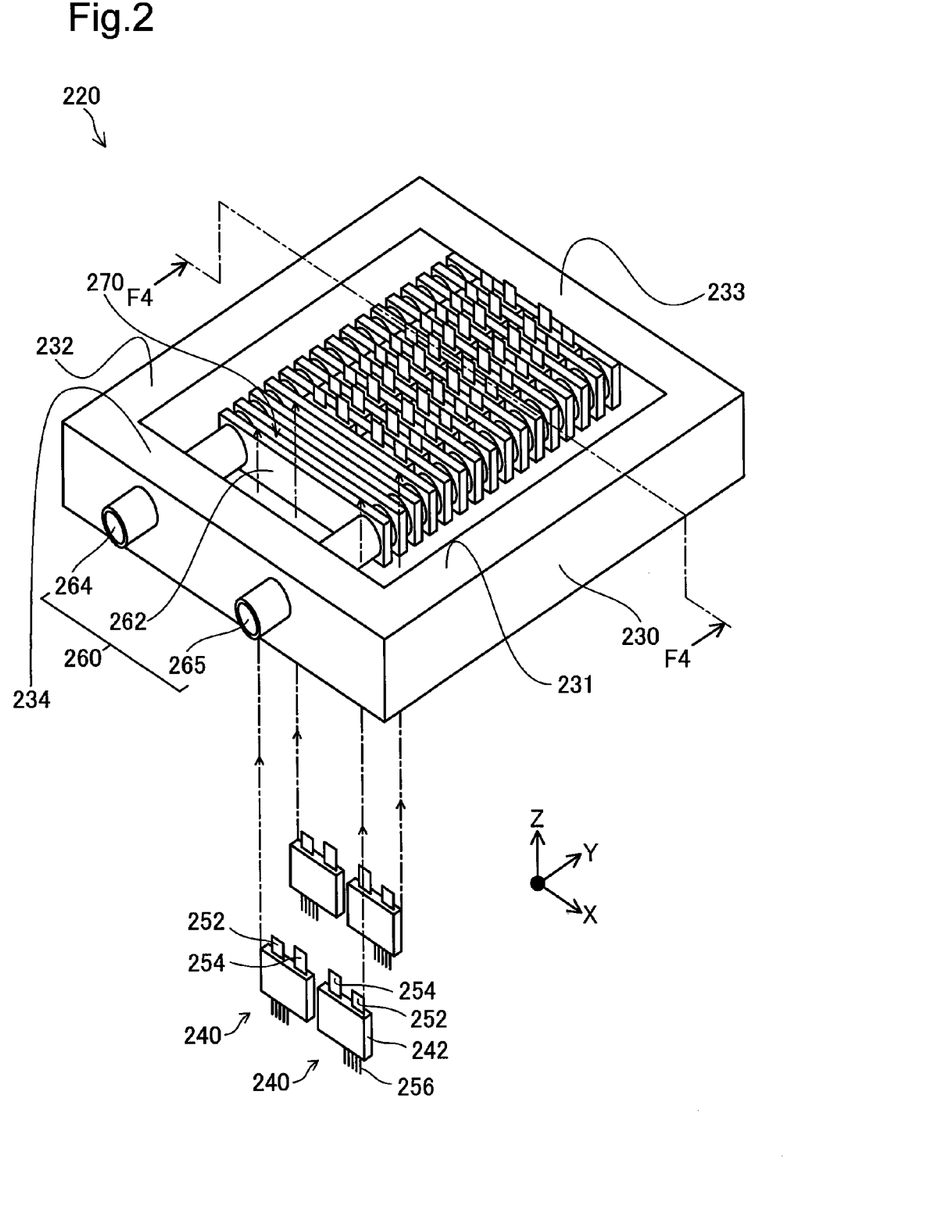
FIG. 2 is a diagram illustrating the detailed configuration of an IPM.

FIG. 2 is a diagram illustrating the detailed configuration of the IPM 220. The IPM 220 is configured to include a holder portion 230, semiconductor modules 240 and a cooling portion 260. The holder portion 230 is a frame-like member and is placed on a −X-axis direction side of the reactor 320.

The holder portion 230 is configured to have a side 231, a side 232, a side 233 and a side 234. The side 231 is a +X-axis direction side of the holder portion 230. The side 232 is a −X-axis direction side of the holder portion 230. The side 233 is a +Y-axis direction side of the holder portion 230. The side 234 is a −Y-axis direction side of the holder portion 230.

The holder portion 230 holds the semiconductor module 240 and cooling plates 262 of the cooling portion 260 inside of the frame such that the semiconductor modules 240 and the cooling plates 262 are alternately stacked and are pressurized. According to this embodiment, the direction of stacking is the Y-axis direction. Respective ends of the holder portion 230 in the X-axis direction form respective ends of the IPM 220.

The semiconductor module 240 is a module formed by sealing a semiconductor element in a plate-like member. According to this embodiment, the boost converter 120 is a power conversion device configured to boost the voltage of three-phase DC power. Ten semiconductor modules 240 are used for each phase, so that the IPM 220 includes a total of thirty semiconductor modules 240.

The cooling portion 260 is a cooling device of double-side stacked cooling structure configured to cool down the respective surfaces of the semiconductor modules 240. The cooling portion 260 is configured to include a plurality of cooling plates 262, an inlet pipe 264, an outlet pipe 265, and slits 270.

The cooling plate 262 is a plate-like member with a flow path formed inside thereof to allow for a flow of cooling water. The inlet pipe 264 is a pipe arranged to introduce a cooling medium from outside of the IPM 220 into each of the plurality of cooling plates 262. The outlet pipe 265 is a pipe arranged to discharge the cooling medium from each of the plurality of cooling plates 262 to the outside of the IPM 220.

The slit 270 is a space formed between each adjacent pair of cooling plates 262. Two semiconductor modules 240 are arrayed along the X-axis direction and are placed in each slit 270. According to this embodiment, the cooling portion 260 includes sixteen cooling plates 262, and fifteen slits 270 are formed between respective adjacent pairs of cooling plates 262. A total of thirty semiconductor modules 240 are accordingly placed in the slits 270.

Figure 3:
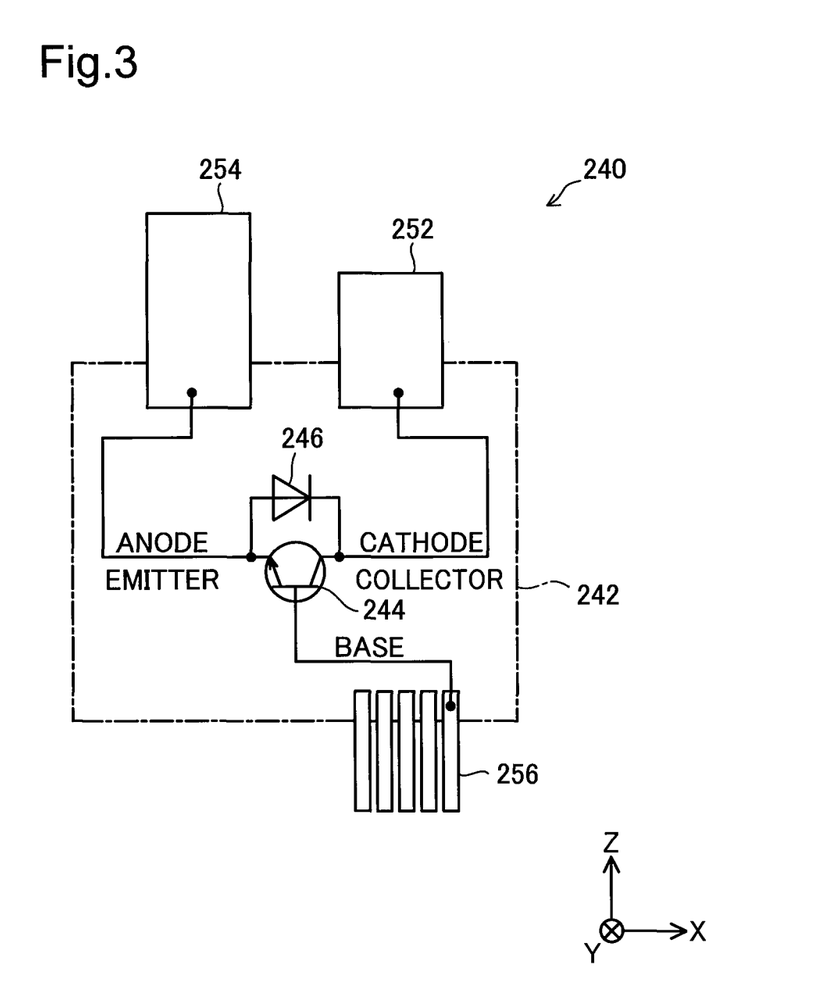
FIG. 3 is a diagram illustrating the detailed configuration of a semiconductor module.

FIG. 3 is a diagram illustrating the detailed configuration of the semiconductor module 240. The semiconductor module 240 is configured to include an insulating portion 242, a connection terminal 252, a connection terminal 254 and control terminals 256.

The insulating portion 242 is an insulating plate-like member with a switching element 244 and a diode element 246 sealed inside thereof. The switching element 244 is an insulated gate bipolar transistor (IGBT) and is controlled by a control board (not shown) mounted in the boost converter 120. The diode element 246 is connected between a collector and an emitter of the switching element 244 such that the electric current flows from the emitter side toward the collector side.

The connection terminal 252 is a plate-like electrical conductor protruded from a +Z-axis direction side of the insulating portion 242. The connection terminal 252 is electrically connected with the collector of the switching element 244 and with a cathode of the diode element 246 inside of the insulating portion 242.

The connection terminal 254 is a plate-like electrical conductor protruded from the +Z-axis direction side of the insulating portion 242. The connection terminal 254 is electrically connected with the emitter of the switching element 244 and with an anode of the diode element 246 inside of the insulating portion 242.

According to this embodiment, the semiconductor module 240 is held by the holder portion 230 such that the connection terminal 252 and the connection terminal 254 are protruded from a +Z-axis direction side of the holder portion 230.

The control terminal 256 is a pin-shaped electrical conductor protruded from a −Z-axis direction side of the insulating portion 242. According to this embodiment, five control terminals 256 are arranged in parallel with one another, and one of the control terminals 256 is connected with a base of the switching element 244 inside of the insulating portion 242. The control terminals 256 are connected with the control board (not shown) mounted in the boost converter 120.

Referring back to FIG. 1, the following describes the range R1 and the range R2. The range R1 is a range in the X-axis direction defined by a −X-axis direction end of the holder portion 230 and a +X-axis direction end of the reactor 320. The range R2 is a range in the X-axis direction defined by the respective ends of the holder portion 230. The range R1 and the range R2 are ranges extended in the Y-axis direction and in the Z-axis direction.

The +X-axis direction end of the reactor 320 includes a +X-axis direction end of a fixing component (not shown) that is configured to hold the reactor 320 and fix the reactor 320 to another component of the boost converter 120. For example, the fixing component is a reactor case configured to place the reactor 320 therein, the +X-axis direction end of the reactor 320 includes a +X-axis direction end of the reactor case.

Part of the fuel cell stack 110 and the second bus bar 520 are placed inside of the range R1. This configuration prevents increase of the dimension of the boost converter 120 in the X-axis direction, compared with a configuration that a second bus bar is placed outside of the range R1.

Figure 4:
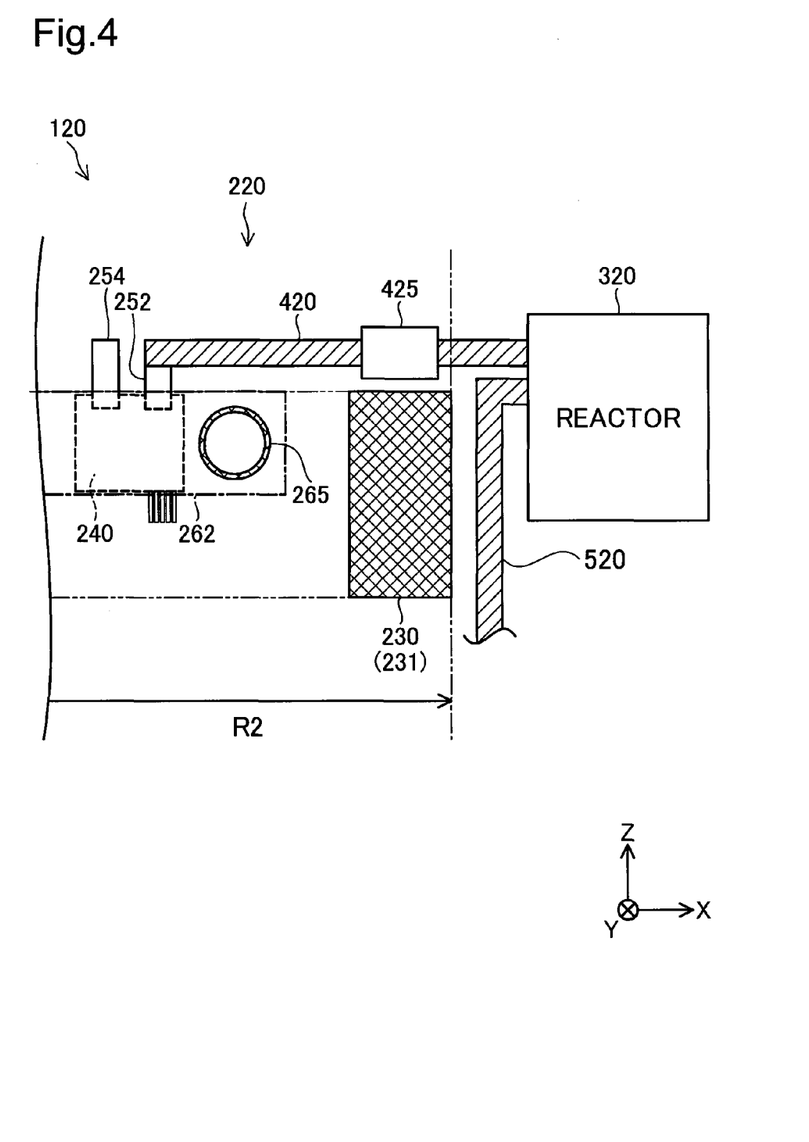
FIG. 4 is a diagram illustrating the boost converter when being viewed from a −Y-axis direction side thereof.

FIG. 4 is a diagram illustrating the boost converter 120 when being viewed from a −Y-axis direction side thereof. FIG. 4 illustrates a schematic section of the IPM 220 taken along an arrow F4-F4 in FIG. 2. The first bus bar 420 is arranged to electrically connect the reactor 320 with the connection terminals 252 of the semiconductor modules 240 held in the holder portion 230.

The first bus bar 420 is provided with a current sensor 425. The current sensor 425 is configured to detect the electric current flowing from the reactor 320 to the semiconductor modules 240. According to this embodiment, the current sensor 425 is provided in the first bus bar 420 such as to be placed inside of the range R2.

According to this embodiment, the first bus bar 420 is arranged to connect three connection terminals 252 in parallel and electrically connect the three connection terminals 252 with the reactor 320. According to this embodiment, the first bus bar 420 includes a branch portion branched to connect the three connection terminals 252 in parallel and a linear portion extended from the reactor 320 to the branch portion. The current sensor 425 is provided in the linear portion. According to another embodiment, multiple current sensors 425 corresponding to the number of branches may be provided in the branch portion.

According to this embodiment, the current sensor 425 is placed inside of the range R2 and within a width in the X-axis direction of the side 231 of the holder portion 230. According to another embodiment, the current sensor 425 may be placed inside of the range R2 and on a −X-axis direction side of the side 231.

According to this embodiment, the dimension of the current sensor 425 in the X-axis direction is smaller than the width of the side 231 of the holder portion 230 in the X-axis direction. According to another embodiment, the dimension of the current sensor 425 in the X-axis direction may be larger than the width of the side 231 of the holder portion 230 in the X-axis direction.

As described above, the configuration of the embodiment prevents increase of the dimension of the boost converter 120 in the X-axis direction, compared with a configuration that a current sensor is entirely placed outside of the range R2. More specifically, the current sensor 425 is placed at a position shifted from the holder portion 230 in the Z-axis direction and inside of the holder portion 230 in the X-axis direction. This configuration prevents increase of the dimension of the boost converter 120 in the X-axis direction by the dimension of the current sensor 425 placed inside of the range R2, compared with the configuration that the current sensor is entirely placed outside of the range R2.

The boost converter 120 is placed on the +Z-axis direction side of the fuel cell stack 110. This configuration prevents increase of the dimension of the fuel cell unit 100 in the X-axis direction.

B. Modifications

According to another embodiment, the first bus bar 420 and the current sensor 425 may be molded from a resin to be integrated with each other. This modified configuration enables the first bus bar 420 and the current sensor 425 to be treated as an integral component and thereby simplifies assembly of the boost converter 120, compared with a configuration that the first bus bar 420 and the current sensor 425 are not integrated with each other.

According to the first embodiment, the IPM 220 and the reactor 320 are arrayed along the X-axis direction that is the vehicle width direction. The present disclosure is, however, not limited to this configuration. For example, the IPM 220 and the reactor 320 may be arrayed along the Y-axis direction that is the longitudinal direction of the vehicle.

The first bus bar 420 and the second bus bar 520 are respectively illustrated as the member including the portion extended in the X-axis direction and as the member including the portion extended in the X-axis direction and the portion extended in the Z-axis direction in FIGS. 1 and 4. The present disclosure is, however, not limited to this configuration. For example, each of the first bus bar 420 and the second bus bar 520 may be configured to include a portion extended in the X-axis direction, a portion extended in the Y-axis direction and a portion extended in the Z-axis direction.

According to the first embodiment, part of the fuel cell stack 110 is placed inside of the range R1. The present disclosure is, however, not limited to this configuration. For example, the entire fuel cell stack 110 may be placed inside of the range R1.

According to the first embodiment, the current sensor 425 is provided in the first bus bar 420 such as to be placed inside of the range R2. The present disclosure is, however, not limited to this configuration. For example, the current sensor 425 may be provided in the first bus bar 420 such that at least part of the current sensor 425 is placed inside of the range R2. This modified configuration prevents increase of the dimension of the boost converter 120 in the X-axis direction by the dimension of the part of the current sensor 425 placed inside of the range R2.

According to the first embodiment, the second bus bar 520 is placed on the −Z-axis direction side of the first bus bar 420. The present disclosure is, however, not limited to this configuration. For example, the second bus bar 520 may be placed on a −Z-axis direction side of the reactor 320 and may be arranged to connect a −Z-axis direction part of the reactor 320 with a +Z-axis direction part of the fuel cell stack 110. In this modified configuration, the second bus bar 520 is a member including a portion extended in the Z-axis direction. The second bus bar 520 may be a member formed in any arbitrary shape as long as the second bus bar 520 is placed inside of the range R1.

Figure 5:
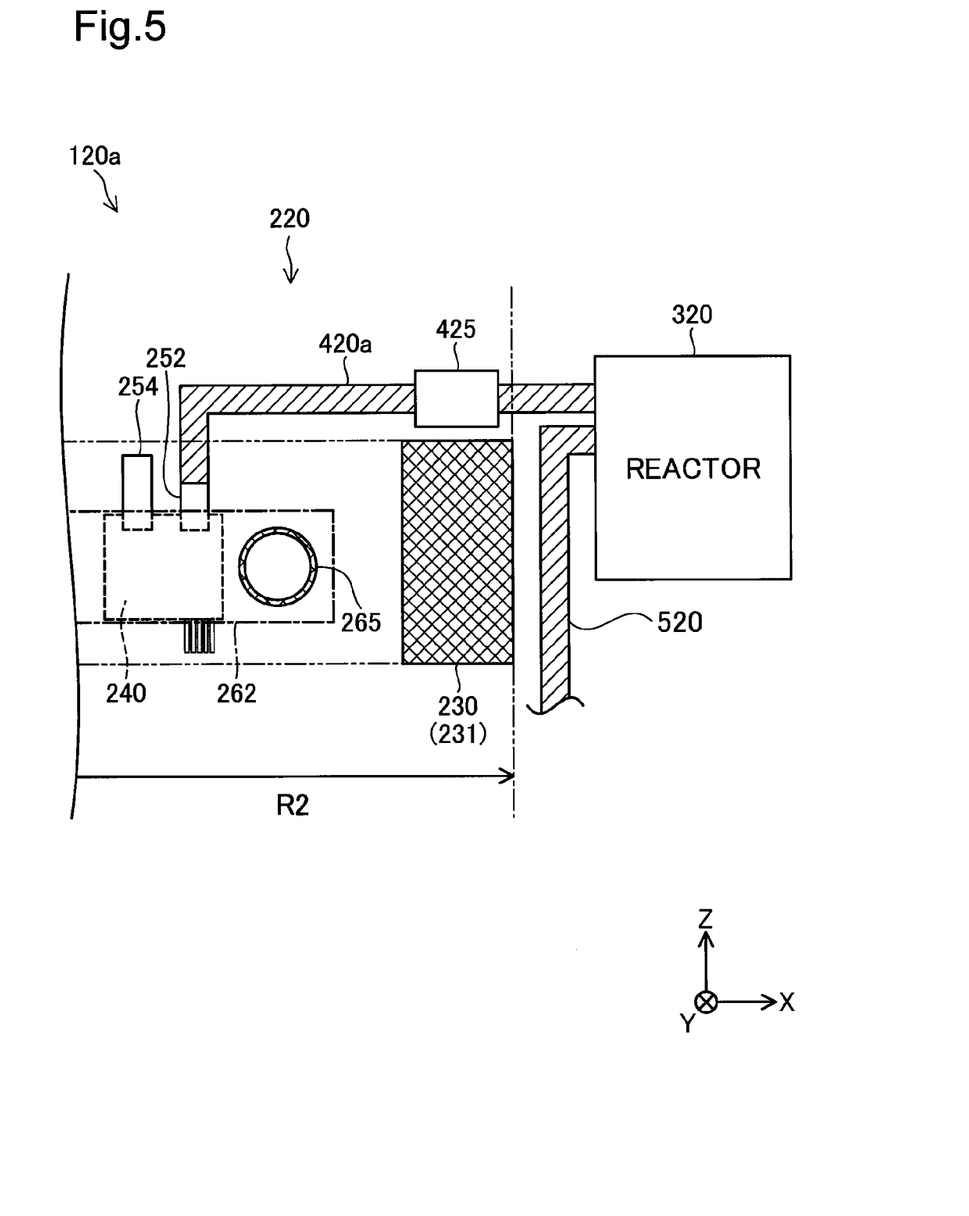
FIG. 5 is a diagram illustrating a boost converter according to another embodiment when being viewed from a −Y-axis direction side thereof.

FIG. 5 is a diagram illustrating a boost converter 120a according to another embodiment when being viewed from a −Y-axis direction side thereof. The boost converter 120a differs from the boost converter 120 by different heights in the Z-axis direction of the semiconductor modules 240 and the cooling plates 262 held in the holder portion 230 and a different shape of a first bus bar 420*a* from the first bus bar 420, but otherwise has a similar configuration to that of the boost converter 120.

In the boost converter 120*a*, the semiconductor module 240 is held by the holder portion 230 such that the connection terminal 252 and the connection terminal 254 are placed inside of the holder portion 230 in the Z-axis direction. In the boost converter 120*a*, the first bus bar 420*a* includes a bent portion that is bent in the −Z-axis direction from a −X-axis direction end thereof to be electrically connected with the connection terminal 252. According to the first embodiment, the semiconductor module 240 is held in the holder portion 230 such that the connection terminal 252 and the connection terminal 254 are protruded from the +Z-axis direction side of the holder portion 230. The present disclosure is, however, not limited to this configuration but may be applied to the configuration illustrated in FIG. 5.

The disclosure is not limited to any of the embodiments, the examples, and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a boost converter mounted in a front room of a vehicle that is a space provided on a front side of a vehicle interior and configured to boost a voltage output from a power source mounted on the vehicle. The boost converter comprises a reactor electrically connected with the power source; a semiconductor module configured to include a plate-like member and a terminal protruded from the plate-like member; a holder portion provided as a frame-like member, arranged to be adjacent to the reactor along either a longitudinal direction of the vehicle or a vehicle width direction, and configured to hold a plurality of the semiconductor modules inside of a frame of the holder portion such that the plurality of semiconductor modules are stacked and pressurized; and a first bus bar arranged to electrically connect the reactor with the terminal and provided with a current sensor that is configured to detect an electric current flowing from the reactor to the semiconductor modules. At least part of the current sensor is provided in the first bus bar such as to be placed inside of a range that is defined by respective ends of the holder portion in an array direction in which the reactor and the holder portion are arranged to be adjacent to each other. This configuration of the boost converter prevents increase of the dimension of the boost converter in the array direction in which the reactor and the holder portion are arranged to be adjacent to each other, compared with a configuration that the current sensor is entirely placed outside of the range that is defined by the respective ends of the holder portion in the array direction in which the reactor and the holder portion are arranged to be adjacent to each other.

(2) The boost converter of the above aspect may further comprise a second bus bar arranged to electrically connect the power source with the reactor. At least part of the power source and the second bus bar may be placed inside of a range in the array direction that is defined by an opposite end of the holder portion that is opposite to a side where the reactor is placed in the array direction viewed from the holder portion and an opposite end of the reactor that is opposite to a side where the holder portion is placed in the array direction viewed from the reactor. This configuration prevents increase of the dimension of the boost converter in the array direction in which the reactor and the holder portion are arranged to be adjacent to each other, compared with a configuration that the second bus bar is placed outside of the range in the array direction that is defined by the opposite end of the holder portion that is opposite to the side where the reactor is placed in the array direction viewed from the holder portion and the opposite end of the reactor that is opposite to the side where the holder portion is placed in the array direction viewed from the reactor.

(3) In the boost converter of the above aspect, the first bus bar and the current sensor may be molded from a resin to be integrated with each other. This configuration enables the first bus bar and the current sensor to be treated as an integral component and thereby simplifies assembly of the boost converter.

(4) In the boost converter of the above aspect, the power source may be a fuel cell. The boost converter may be arranged to be arrayed with the fuel cell in a perpendicular direction that is orthogonal to the array direction. According to this aspect, the boost converter and the fuel cell are arrayed in the perpendicular direction. This configuration prevents increase of a dimension of a fuel cell unit including the fuel cell and the boost converter in the array direction in which the reactor and the holder portion are arranged to be adjacent to each other.

The present disclosure is not limited to the aspects of the boost converter mounted in the front room of the vehicle as described above but may be implemented by any of various other aspects, for example, a boost converter mounted on a marine vessel that is driven with electric power as the power source. The present disclosure is not limited to any of the aspects described above but may be implemented by a diversity of other aspects without departing from the scope of the disclosure.

What is claimed is:

1. A boost converter mounted in a front room of a vehicle that is a space provided on a front side of a vehicle interior, and configured to boost a voltage output from a power source mounted on the vehicle, the boost converter comprising:
    a reactor electrically connected with the power source;
    a semiconductor module configured to include a plate-like member and a terminal protruded from the plate-like member;
    a holder portion provided as a frame-like member, arranged to be adjacent to the reactor along either a longitudinal direction of the vehicle or a vehicle width direction, and configured to hold a plurality of the semiconductor modules inside of a frame of the holder portion such that the plurality of semiconductor modules are stacked and pressurized; and
    a first bus bar arranged to electrically connect the reactor with the terminal and provided with a current sensor that is configured to detect an electric current flowing from the reactor to the semiconductor modules, wherein
    at least part of the current sensor is provided in the first bus bar such as to be placed inside of a range that is defined by respective ends of the holder portion in an array direction in which the reactor and the holder portion are arranged to be adjacent to each other.

2. The boost converter according to claim 1, further comprising:

a second bus bar arranged to electrically connect the power source with the reactor, wherein at least part of the power source and the second bus bar are placed inside of a range in the array direction that is defined by an opposite end of the holder portion that is opposite to a side where the reactor is placed in the array direction viewed from the holder portion and an opposite end of the reactor that is opposite to a side where the holder portion is placed in the array direction viewed from the reactor.

3. The boost converter according to claim 1, wherein the first bus bar and the current sensor are molded from a resin to be integrated with each other.

4. The boost converter according to claim 1, wherein the power source is a fuel cell, the boost converter is arranged to be arrayed with the fuel cell in a perpendicular direction that is orthogonal to the array direction.

\* \* \* \* \*